United States Patent [19]

Rudoi

[11] Patent Number: 4,473,653
[45] Date of Patent: Sep. 25, 1984

[54] BALLISTIC-RESISTANT GLASS-CERAMIC AND METHOD OF PREPARATION

[76] Inventor: Boris L. Rudoi, 1170 Chambers Rd., Columbus, Ohio 43212

[21] Appl. No.: 408,114

[22] Filed: Aug. 16, 1982

[51] Int. Cl.$^3$ .............................................. C03C 3/22
[52] U.S. Cl. ........................................... 501/4; 2/2.5; 65/33; 65/134; 428/911; 501/5; 501/10; 501/64; 501/67; 501/69
[58] Field of Search ................. 501/4, 7, 5, 10; 65/33, 65/134; 2/2.5; 428/911, 432

[56] References Cited

U.S. PATENT DOCUMENTS

| | | | |
|---|---|---|---|
| 2,971,853 | 2/1961 | Stookey | 501/4 |
| 3,238,085 | 3/1966 | Hayami et al. | 501/5 |
| 3,380,818 | 4/1968 | Smith | 501/7 |
| 3,804,608 | 4/1974 | Gaskell et al. | 501/4 |
| 3,809,543 | 5/1974 | Gaskell et al. | 501/4 |
| 3,977,857 | 8/1976 | Mattox | 501/5 |

FOREIGN PATENT DOCUMENTS

| | | | |
|---|---|---|---|
| 1007231 | 4/1957 | Fed. Rep. of Germany | 501/5 |
| 49-126712 | 12/1974 | Japan | 501/7 |

OTHER PUBLICATIONS

Handbook of Chemistry and Physics–54th Ed. (1973–1974) p. F-18 "Comparison of Hardness Values of Various Materials on Mohs and Knoop Scales".

Primary Examiner—Helen M. McCarthy
Attorney, Agent, or Firm—Francis T. Kremblas, Jr.

[57] ABSTRACT

A composition and method of making a high strength semi-crystalline ceramic material of the lithium, aluminum, silicon oxides system type. The composition is characterized by a relatively narrow range of lithium, aluminum, silicon and potassium oxides to form a base glass batch and is modified by including a novel proportional combination of the catalysts or modifiers comprising the components $TiO_2$, $ZrO_2$ and $SnO_2$ and including one or more additives taken from a group consisting of $B_2O_3$, MgO, $Cr_2O_3$, $CeO_2$, $V_2O_5$ and $Na_2O$ within specific percentage ranges.

The composition is formed and subjected to heat treatment within certain time and temperature steps to provide for the desired degree, size and type of crystalline formation (lithium disilicate, cristobalite, spinel) which exhibits the desired physical, mechanical and chemical properties which include a superior resistance to high speed projectiles for armor applications.

4 Claims, No Drawings

BALLISTIC-RESISTANT GLASS-CERAMIC AND METHOD OF PREPARATION

BACKGROUND

The glass-ceramic technology has been the subject of many investigations over the last few decades. The work of many in this field has related to several different silicate systems types including the $Li_2O$—$Al_2O_3$—$SiO_2$ systems such as referred to in U.S. Pat. Nos. 2,971,853, 3,252,811, 3,282,712 and 3,380,818.

In these particular systems noted above, the compositions disclosed were those having particular photosensitive or transparent properties, or being particularly suited for lamp working or automatic equipment production.

Other investigations have occurred for various systems and the various modifications which effect strength, hardness, thermal expansion, and certain working properties.

More recently, the lower cost of the raw materials and technology and the apparent high strength of glass-ceramic materials have led to a quest for other applications of such materials, including the potential for application as a light silicate armour to resist high velocity projectiles.

Predicting ballistic resistance properties of glass-ceramic compositions has been found to be elusive since the desired projectile deformation is not necessarily consistent with standard measurements of hardness and strength between different known glass-ceramic compositions. Further, other necessary and desirable requirements for a material for such applications include a high degree of resistance to chemical attack such as by acid, bases or water. Further, the cost and ease of production of given shapes or configurations is an important consideration. The complex reactions occurring in these systems and the effect of various catalysts or additives which may surprisingly modify various properties disproportionately to the amounts added, make the quest for a suitable composition extremely difficult.

Prior to the present invention, a glass-ceramic system such as disclosed herein which possesses exceptional levels of these desirable properties has not been found.

While many prior publications and workers in the art have proposed compositions utilizing some combinations of the components used in the present invention, none have disclosed the same composition of components in the specific ranges disclosed herein nor obtained the characteristics of the material of the present invention.

For example, U.S. Pat. No. 3,282,712 discloses a $Li_2O$—$Al_2O_3$—$SiO$ system in whch $ZrO_2$ and $TiO_2$ are used as additives or nucleating agents to promote crystallization. However, these disclosures teach a much higher $Al_2O_3$ content and an end product having a very low co-efficient of thermal expansion. The final product in this patent includes a main crystalline phase having beta-eucryptite and beta-spodumene type crystals unlike the present invention. There is no disclosure teaching the ratio of the three main modifiers or nucleating agents used by Applicant.

U.S. Pat. No. 3,380,818 also discloses a similar composition range as the above patent. Similarly, it also teaches a higher range of $Al_2O_3$ compared to the present invention and fails to disclose the ratio of modifiers or nucleating agents as taught by Applicant. Further, the end product is characterized by a low coefficient of thermal expansion primarily because it has a predominant amount of beta-eucryptite and beta-spodumene in the main crystalline phase which is undesirable in the present invention.

SUMMARY OF THE INVENTION

The present invention relates generally to a glass-ceramic of the system $Li_2O_{13}$ $Al_2O_3$—$SiO_2$—$K_2O$ type and particularly to a composition which includes a novel combination of modifiers or nucleating agents which provides a glass-ceramic material having an improved and novel combination of properties. A composition of the present invention is particularly applicable to applications such as a light armour to resist high speed projectiles such as shaped charges, or small arm bullets and the like. Additionally, its resistance to chemical attack and its ability to be bonded to certain steels to form a very desirable armour system are extremely important. Of course, many of the properties of a composition formed in accordance with the present invention are desirable for many other useful applications, such as for example, in a shell used for jet-shaped charges in certain drilling techniques.

The basic composition of the present invention comprises $SiO_2$, $Li_2O$, $Al_2O_3$ and $K_2O$ within specific ranges and also include a relatively narrow range of specific crystalline formation modifiers in a given ratio. The combination within the ranges disclosed herein provide compositions capable of forming semi-crystalline glass ceramics which possess the above-described properties. Further, in accordance with the teaching of the present invention, the crystalline formation can be controlled within certain limits and the resulting properties can be varied to most advantageously fit a particular application.

It has been discovered that the essential crystalline formation modifiers are $TiO_2$, $ZrO_2$ and $SnO_2$ in a ratio of approximately 3:2:1 respectively. This ratio of modifiers may vary within approximately 15% of the 3:2:1 ratio and still obtain highly desirable results. However, it is preferred that the 3:2:1 ratio be maintained for the best results for most applications. For the purposes of definition, the term modifier as used herein relating to these components has sometimes been referred to as nucleating agents by others in the art. However, by whatever name, these three agents in my composition together with heat treatment do play an important role in determining the size of the crystals formed and the processing conditions for obtaining the desired crystalline formation.

Other additive agents, in relatively small quantities, may be added on a selected basis to further enhance the processing or final properties of the end product. However, it has been discovered that the combination of $TiO_2$, $ZrO_2$ and $SnO_2$ in a proportional ratio of 3:2:1 respectively, as used with the disclosed ranges of the components of the base glass batch, provide with the proper thermal treatment, a controlled crystallization process in which the crystal structure is of a stable type and of a very small size and exhibits the outstanding properties noted herein, particularly for armour application.

OBJECTS

It is therefore a primary object of the present invention to provide a novel composition and method of making a semi-crystalline material which exhibits a high degree of strength, hardness, resistance to chemical attack and possesses a superior resistance to high speed projectiles highly suitable for armour applications.

It is another object of the present invention to provide a semi-crystalline glass-ceramic material in which the co-efficient of expansion may be adjusted by relatively small compositional changes without significantly degrading the other desirable properties of the end product.

It is another object of the present invention to provide a glass-ceramic material of the type described which also lends itself to be more easily bonded to a steel subplate or mesh to form a composite material useful in a variety of applications, but particularly to the formation of a composite armour system.

It is a further object of the present invention to provide a glass-ceramic material of the type described wherein the crystallization is controlled to promote the selective formation of lithium disilicate, cristobalite and spinel as the main crystal phases to obtain the more desirable characteristics of the end product.

It is still another object of the present invention to provide glass-ceramic compositions of the type described to form multi-layers or simultaneously formed sheets of certain selected composition ranges in which the composition of the layers are adjusted to provide the most desirable characteristics necessary to form an armour material for a variety of specific applications.

It is still another object of the present invention to provide a glass-ceramic material of the type described which possesses the above-noted properties and yet may be easily mass produced in plates of different sizes and geometrical configurations as needed for a variety of particular applications.

DETAILED DESCRIPTION

The present invention relates to certain glass-ceramic compositions of the basic $Li_2O$, $Al_2O_3$, $SiO_2$, $K_2O$ type which are modified by the addition of modifiers consisting of $TiO_2$, $ZrO_2$ and $SnO_2$ in relatively narrow ranges. The semi-crystalline body formed consists primarily of very fine crystals and residual interlayers of glass which tend to bond together the crystalline structure.

Typically glass-ceramic materials of this general type are characterized by improved mechnical strength and hardness values compared to the original glass forming batch. The basic method of thermally treating a glass body to effect in situ crystallization is well-known as are various prior compositions of such thermally crystallized materials for certain characteristic properties and applications.

The components comprising the base glass batch are present in the following compositional ranges in accordance with the present invention; $Li_2O$—approximately 9.5 to 15%; $Al_2O_3$—approximately 1.0 to 6.0%; $SiO_2$—approximately 78.5 to 84.5%; and $K_2O$—approximately 1.0 to 4.0%. The most preferred ranges are as follows: $Li_2O$—11.0 to 13.0%; $Al_2O_3$—1.5 to 4.0%; $SiO_2$—81.0 to 83.0% and $K_2O$—1.5 to 3.0%. All percentages of the components referred to herein are expressed by weight based upon the total of the weight of these four components and is defined herein as the base glass batch.

The modifiers used in accordance with the present invention to obtain controlled crystallization comprise three components, $TiO_2$, $ZrO_2$ and $SnO_2$ in which the ratio between the amount of each is approximately 3:2:1, respectively, and wherein the total amount of the sum of these components is not more than approximately 5% by weight calculated as a percentage of the total weight of the original base glass batch.

Prior workers in glass ceramic materials have used one or more of the catalyst modifiers and often refer to them as nucleating agents. However, the prior disclosures have not suggested the specific combination of these three components in the amounts and ratio disclosed herein nor have these been proposed for us with the compositional ranges comprised in the base glass batch of the present invention.

It has been discovered that the use of all three crystalline modifiers referred to herein in the ratio disclosed, promote a thermally crystallizable glass having the excellent characteristics noted herein. They contribute to the formation of many submicroscopic nuclei within the glass batch over a relatively wide temperature range. Within the amounts specified herein, certain individual disadvantages of any of these components are reduced to a minimum or eliminated. These modifiers are essential to the formation of a very large number of very small crystals which is believed to be one of the major aspects contributing to the high ballistic protection offered by materials of the present invention.

Further, these modifiers do not interfere with the desired formation of the lithium disilicate, cristobalite and spinel crystals when used in accordance with the teachings of the present invention and also improve the chemical resistance to attack by acid, alkaline, or water in the atmosphere of the glass-ceramic end product made from the components in the base glass batch.

The maximum amount of $TiO_2$ to be used in accordance with the present invention is three percent by weight based upon the total weight of the main glass batch. Therefore the maximum amount of $ZrO_2$ is 2% and $SnO_2$ is 1% to maintain the 3:2:1 ratio as disclosed herein. It has been discovered that adjusting the total amount of the combined catalysts within the limits noted herein permit the modification of the physical, mechanical and chemical properties of the final glass-ceramic product to best suit a particular application and therefore provides a means to control the crystallization of the glass-ceramic to modify the properties of the final product.

Several other components in relatively very small quantities are desirable for the purposes of the present invention to enhance the desired crystallization without introducing any deleterious effects during the thermal treatment. $V_2O_5$, $CeO_2$, $Cr_2O_3$, and $Na_2O$ may be added in the range of amounts discussed later herein to enhance the desired form of crystallization or the processing conditions.

Compositions noted herein and in accordance with the method of heat treating disclosed, form a glass-ceramic end product possessing a co-efficient of thermal expansion curve that is very similar to the curve for certain types of steel alloys. Therefore, the potential for bonding a steel subplate or mesh to such a glass-ceramic is materially enhanced to provide the basis for a heavy armour suitable for protection against larger and heavier types of advanced weaponery.

Tests have indicated that projectile deformation or fragmentation in the typical small arms range of velocity is dramatically superior for materials made in accordance with the present invention. Other tests reveal that such materials show surprisingly excellent resistance to shaped charge projectiles.

The main glass batch composition and the preferred heat treatment of the present invention has been found to provide for the preferred crystallization of lithium disilicate, cristobalite and spinel as the primary crystalline phases present in the end product.

The formation of beta-eucryptite and beta-spodumene type crystals in the major phase are undesirable and are to be avoided because of their very low coefficients of thermal expansion.

Low coefficients of thermal expansion of glass-ceramic would not lend such materials to being bonded to steel alloys. Further, glass-ceramics having such crystal structure do not appear to possess the excellent resistance to high speed projectiles as compared to those formed in accordance with the present invention.

In addition to the higher percentage of lithium oxide compared to aluminum oxide and the high range of silicon oxide, the inclusion of potassium oxide in the disclosed range improves the resistance to chemical attack. Further, it is very desirable to introduce the amount of potassium oxide desired by using potassium nitrate as one of the starting materials. The subsequent chemical reaction upon heating and melting the glass batch provides a significant release of oxygen which is desirable to avoid a reducing atmosphere. A reducing atmosphere during heat treatment may cause an undesirable reduction in the titanium ion (from $Ti^{4+}$ to $Ti^{3+}$) which is present because of the use of $TiO_2$ modifier.

It has been previously published that glass-ceramic compositions of the lithium, aluminum and silicon oxides system types which include lithium oxides in the higher range specified herein have low resistance to chemical attack.

However, I have discovered that the compositional ranges noted herein which include the three modifiers or "nucleating agents" provide a glass-ceramic with excellent resistance to chemical attack. Further, the addition of magnesium oxide and certain other of the additives in relatively small quantities tends to further enhance the resistance to chemical attack and the excellent mechanical strength of the end product.

By varying the amount of the components of the base glass batch and the three modifiers, as well as the additives which are disclosed herein, the properties such as hardness, coefficient of thermal expansion and tendency to bond to certain alloy steels can be effectively varied to permit a formation of a composite of a plurality of layers of various compositions within the ranges disclosed herein to maximize the benefits of the end product to a given application.

For example, magnesium oxide appears to improve both mechanical strength and chemical resistance. However, it should not exceed the amount of aluminum oxide and preferably should be added in an amount approximately equal to between thirty and fifty percent of the amount of aluminum oxide on a weight basis.

Additives of magnesium oxide can improve the solubility of zirconium oxide in the glass mass and within the upper limit disclosed herein tends to decrease the coefficient of thermal expansion particularly at high temperatures such as 600 to 800 degrees C., and increases the hardness of the final product. Therefore, as the outer layer of a multilayered ceramic structure, compositions having near the upper limit of magnesium oxide may be chosen while the rearwardmost layer would comprise a modified composition having a greater co-efficient of expansion curve matched to an alloy steel to which it is bonded.

It has been found that adding not more than 3.5% by weight of sodium oxide aids the bonding ability of the composition to certain alloy steels and lowers the melting temperature of the glass batch. However, such additives also tend to reduce the hardness of the final product. This reduction in hardness and possible reduction of mechanical strength likely occurs because the oxides $Na_2O$ and $K_2O$ in such compositions remains in the glassy phase during crystallization process which increases the percentage of the glass phase in the end product. Therefore it is preferred that when $Na_2O$ is added, the total percentage of $Na_2O$ and $K_2O$ in combination is less than approximately five percent to maintain a sufficient level of strength and hardness. Therefore in the composite layered structure referred to above, the composition of the layer adjacent to the steel alloy might include $Na_2O$ as one of the additives to improve the bonding characteristics of the composite armour structure to a steel backing while other layers are formed from compositions which do not include $Na_2O$ and which possess the most preferred mechanical strength and hardness characteristics.

Additives of $Na_2O$ also could assist the precipitation of lithium disilicate during thermal treatment for the crystallization process.

Small quantities of $B_2O_3$ are preferred as another additive up to approximately 1.2% based upon the total weight of the base glass batch. $B_2O_3$ is known as an aid to the melting of a glass batch as it improves the working properties of the glass mass and therefore reduces the formation of micro-cracks during the thermal treatment.

However, of greater significance in the compositions of the present invention is the fact that small amounts of $B_2O_3$ significantly increase the chemical resistance. Further, the addition of $B_2O_3$ also aids the formation of the more desirable form of crystals during the crystallization process. Cations of boron have the ability to inhibit the creation of aluminum and titanium complexes and could intesify and separate rutile directly from the glass. The cations of boron also accelerate the disintegration of aluminotitanate. This fact was indicated by X-ray analysis of samples of product made in accordance with the present invention which did not show any formation of aluminotitanate ($Al_2O_3.TiO_2$) type crystals. $B_2O_3$ also appears to favor the formation of spinel ($MgO.Al_2O_3$) and stabilizes the same by the implantations of boron cations in that crystal structure.

As the amount of $B_2O_3$ is increased toward the upper limit noted herein, the solubility of the modifier $ZrO_2$ in the melted glass batch will increase since $ZrO_2$ is assimilated more readily by boron silicate glass compared to silicate glass.

Other additives which are preferred for compositions made in accordance with the present invention are $CeO_2$ and $Cr_2O_3$.

$CeO_2$ is a strong oxidating agent which is desirable to aid creation of an oxidating atmosphere in the melting of the main glass batch and acts as a refining agent. $CeO_2$ also increases resistance to neutron radiation which is a desirable trait in military armour applications. The maximum amount of $CeO_2$ should be no greater than 1.5% of the weight of the components of the main glass batch. This components does not interfere with the desired crystallization within the ranges suggested herein.

$Cr_2O_3$ is a desirable additive in relatively small quantities. It is used in amounts ranging up to 0.6% by weight of the main glass batch. It should not exceed more than approximately 15% of the total amount of $Al_2O_3$ in any given composition. $Cr_2O_3$ enhances the creation of spinel and rutile crystals. Additives of $Cr_2O_3$ also enhance resistance to chemical attack of the glass-ceramic formed in accordance with the present invention.

In some applications, $V_2O_5$ may be used in small concentrations and tends to increase the volume of certain crystal phases, such as rutile. The vanadium ions may also replace the titanium ions in the rutile crystal structure.

Small amount of the additives referred to above within the upper limits noted, have a significant effect on the desirable characteristics such as resistance to chemical attack on neutron radiation, however, they do not interfere or change the formation of the desirable crystals during the crystallization process.

Other minor conventional constituents of glass or insubstantial amounts of impurities may be present in compositions of the present invention, however, the term minor is defined herein as relating to an amount which has no significant unfavorable effect on the desired characteristics of the end product made in accordance with the present invention.

Table I below lists a number of compositions and the weight percentage of the various components within the preferred range of components representative of examples of the present invention.

TABLE I

| Example | 1 | 2 | 3 | 4 | 5 | 6 |
|---|---|---|---|---|---|---|
| $SiO_2$ | 81.0 | 81.5 | 82 | 82.5 | 83 | 82 |
| $Li_2O$ | 12.5 | 12.5 | 12.5 | 12.5 | 12.5 | 12.5 |
| $Al_2O_3$ | 4.0 | 3.5 | 3.0 | 2.5 | 2.0 | 1.5 |
| $K_2O$ | 2.5 | 2.5 | 2.5 | 2.5 | 2.5 | 2.5 + 1.5 $K_2O$ + $Na_2O$ |
| % | 100 | 100 | 100 | 100 | 100 | 100 |
| MgO | 1.6 | 1.4 | 1.2 | 1.0 | 0.8 | 0.6 |
| $B_2O_3$ | 0.015 | — | — | — | — | — |
| $Cr_2O_3$ | 0.030 | 0.025 | 0.020 | 0.015 | 0.010 | 0.025 |
| $CeO_2$ | 0.05 | 0.05 | 0.05 | 0.05 | 0.05 | 0.05 |
| $TiO_2$ | 0.660 | 0.600 | 0.540 | 0.480 | 0.380 | 0.540 |
| $ZrO_2$ | 0.440 | 0.400 | 0.360 | 0.320 | 0.280 | 0.360 |
| $SnO_2$ | 0.220 | 0.200 | 0.180 | 0.160 | 0.140 | 0.180 |
| $V_2O_5$ | — | — | — | — | — | 0.20 |
| Soft C | 935 | 927 | 918 | 912 | 903 | 863 |
| Ann C | 525 | 519 | 511 | 506 | 498 | 502 |
| Knoop Hardness 500 Gram Penetrator | 635 | 620 | 610 | 585 | 570 | 505 |

Also included in Table I is the softening and annealing temperature of the examples and the Knoop Hardness value based upon the conventional standard testing procedure using a 500 gram penetrator. The hardness values listed are the average test values for each sample composition end product.

The process of melting the glass batch and the thermal treatment to obtain crystallization is generally similar to conventional techniques well-known in the prior art.

The starting glass batch is prepared in a generally conventional manner. The components are ball milled together prior to melting to obtain better homogeneity and efficient melting. The batch is then heated to approximately 1550 degrees C., plus or minus 20 degrees C. depending upon the specific composition. The important factor to be obtained in this melting process is to assure a homogeneous melt and maintenance of an oxidizing atmosphere. Barbotage of the glass mass is desirable to improve homogeneity and appears to promote crystallization during the second step of the process to begin at lower temperatures than those batches in which barbotage is not employed.

In laboratory conditions, the samples indicated in the examples listed in Table I were melted in open crucibles. The glass mass was molded and the samples were placed in an annealing furnace.

This first heat treatment in the annealing furnace may be between 480 degrees to 530 degrees C. The annealing process can take between 1 to 24 hours depending upon the size and geometrical form of the molded product. The sample compositions listed in Table I were molded in flat plate form having a thickness of approximately one-half inch and being 4 inches to 4 inches square. The annealing step is important to create good conditions for the formation of finer crystals during the subsequent thermal treatment. Cooling the sample during the annealing step at this stage can be done at a rate of approximately 0.5 degrees to 2 degrees per minute. Once the temperature reaches 380 degrees C. to 300 degrees C., the rate of cooling may be increased to between 3 to 12 degrees C. per minute until room temperature is reached. The annealing step is important because it can effect the favorable formation of nuclei of future phases which can be created during the next step of treatment.

I prefer an initial annealing temperature of approximately 510 degrees C. which is held for one and one-half to two and one-half hours. The sample then may be cooled to about 320 degrees C. at a rate of approximately one degree C. per minute. The cooling may then continue at an increased rate of approximately 5 degrees C. per minute to room temperature.

The second thermal treatment of the annealed samples consists of heating at a rate of approximately 1 to 5 degrees C. per minute from room temperature to approximately between 480 to 530 degrees C. in a conventional thermal treatment glass furnace.

The temperature of the molded formed product is then increased from 480 to 530 degrees C. range to approximately 680 to 725 degrees C. at a rate of temperature increase of approximately 0.3 to 1.0 degrees C. per minute. The lower rate of temperature increase during this stage is very important to maintain the desirable, very small size of the crystals being formed.

Once the temperature reaches 680 to 725 degrees C., this temperature must be held at least 30 minutes and may be held up to 24 hours. For those compositions having an amount of $SiO_2$ in the higher ranges, the holding times and temperature should be increased to approximately one hour or greater for better results.

After holding the temperature at the 680 to 725 degrees C. range for the appropriate interval, the temperature may be increased again at a rate of approximately 0.5 to 6 degrees C. per minute until 850 degrees C. (plus or minus 20 degrees C.) is reached. This temperature is held again for approximately 20 minutes. This holding time may vary between 5 minutes up to about 5 hours. Unless it is deemed necessary for a given composition or application, the longer holding times obviously are not advantageous in mass production.

Within these limited thermal processing times and rate of temperature increase, specimens of typical size can be formed with good results according to the present invention. The particular composition chosen and the desired end use of the product can influence the processing choice.

The length of the time a given specimen is held within the ranges discussed herein is also a function of the particular dimensions of the product. For example, the thickness and overall dimensions require longer holding times to assure uniform temperatures are reached through the mass of the product being treated.

The second stage of preferred heat treatment for the 4×4 inch specimens having compositions noted in Examples 1 through 5 of Table I is described below.

After annealing was completed, the specimen was heated at a rate of three degrees C. per minute from room temperature to approximately 520 degrees C. Then heat treatment continued at a rate of temperature increase of approximately 0.5 degrees C. per minute until the temperature reached approximately 710 degrees C. The temperature was held at 710 degrees C. for approximately one hour. After this holding period, the temperature was again increased at the rate of approximately one degree °C. per minute until it reached approximately 850 degrees C. This temperature was held for approximately twenty minutes. Then the specimen was cooled at a rate of approximately one degree C. per minute from 850 degrees C. to approximately 320 degrees C. Then the cooling rate was increased to five degrees C. per minute until room temperature was reached.

The method steps described herein prevent the possibility of deformation of the product and ensures good mechanical properties in accordance with the present invention. However, those skilled in the art, based upon the above described process conditions, will be able to determine specific times and temperatures and variations thereof to obtain a semi-crystalline end product having excellent characteristics in accordance with the teachings of the present invention.

If a composition is employed wherein the $Al_2O_3$ and MgO are increased toward the upper limit of the ranges noted herein, the temperature can be slightly increased to 880 degrees C. within plus or minus 10 degrees C. and this temperature may be held for up to approximately two hours depending on the configuration and mass of the individual product specimen.

The composition noted in Example 6 of Table I which includes $Na_2O$ is not intended for a single composition sample but represents a preferred composition which could be used in a multiple layer product having a steel backing plate bonded thereto as referred to earlier herein.

The heat treatment of such a layered specimen would require some adjustment and vary depending upon the dimensional characteristics and the number of layers employed of the various compositions chosen within the compositional ranges disclosed herein.

After holding the temperature at the maximum for the proper times, the product should be cooled to a temperature between 300 to 400 degrees C. at a rate of approximately 0.5 to 3 degrees per minute. I prefer to cool to between 310 to 330 degrees C. at this rate. Then the cooling can continue to room temperature at a higher rate of approximately 2 to 12 degrees C. per minute.

Tests were run on a sample specimen made in accordance with the present invention employing the composition listed in Example 2 of Table I. These tests were conducted using a 0.30 caliber rifle fired into a small square plate of the glass-ceramic approximately four inches on a side and one-half inch thick. The distance was approximately 5 feet from the rifle to the target sample and the impact velocity of the standard 0.30 caliber copper jacketed lead bullet was approximately 2500 feet per second, well representative of typical small arms fire.

The target was placed in an appropriate collector enclosure in order to capture the fragments of target and the bullet projectile to obtain a measure of projectile deformation which is an excellent indicator of ballistic protection. In three firings into 3 separate plates, the 0.30 caliber bullet projectile was completely fragmented into very small pieces. It was estimated that the fragmentation of the bullet's copper jacket exceeded several hundred pieces as some were too small to recover and an accurate count was not possible. The lead portion essentially disappeared and merely trace amounts were noted on the pieces of the target and appeared as dark streaks. No large pieces of lead or the jacket completely penetrated through the walls of the collector enclosure.

The target plate of the glass-ceramic used broke upon impact into several large pieces. It would be expected that a relatively thin steel backing plate or a steel mesh bonded to the back of or embedded in the glass-ceramic would have held the glass-ceramic together and prevented total break up of the plate.

These results indicate that the glass-ceramic end product of the present invention possess significantly greater ballistic protection characteristics than other materials such as aluminum oxide or any other known glass-ceramics.

This fact is particularly noteworthy as the density of the glass-ceramic of the present invention is approximately between 2.45 to 2.50 grams per cubic centimeter compared to aluminum oxide at 3.97 grams per cubic centimeter. Further, the glass-ceramic of the present invention is less expensive than aluminum oxide and may be fabricated into complex shapes much more easily and less expensively.

Another series of tests using similarly formed samples made in accordance with Example 1 were conducted comparing these samples with a mild steel plate. These tests were conducted using a shaped charge jet tapper commercially available from the Dupont Co. The conclusions of these tests were very encouraging in that the glass-ceramic of Example 1 was indicated as better than steel in stopping the jet tapper on both a thickness and a weight basis. The glass-ceramic was indicated to be better than steel by approximately a two to one basis in thickness and approximately a six to one basis in weight. Also a comparison with glass indicated that it was approximately as effective with respect to the jet tapper test but did not completely pulverize upon impact as did glass. Therefore, bonding a steel mesh or plate onto the back surface to hold the glass-ceramic together would make it better than glass in stopping a shaped charge jet tapper.

The indications of this test are very important and encouraging in an application for heavy armour which must give ballistic protection against shaped charge projectiles in military applications and might prove very applicable to tank armour in meeting the advanced weaponry being presently employed.

The samples of specimens made from the compositions in Table I possessed a co-efficient of thermal expansion at varying temperature up to 800 degree C. having values ranging from 100 to 125 times $10^{-7}$ per degree C. which are of the same character as certain steel alloys.

Further, sample specimens showed excellent bonding characteristics to such steels with no separation of the bond after submitting the bonded samples to 950 degrees C. for 30 minutes.

Since the nature of testing the effectiveness of such armour against other forms of advanced weaponry in a heavy armour application is impossible without the direct involvement of the United States government and the very significant expense involved, any further testing to date has not been possible. However, the preliminary tests referred to herein represent very significant evidence that the glass-ceramic of the present invention possesses extraordinary physical properties relating to ballistic protection above that of other known compositions of this general type.

Since the ballistic protection properties and the relatively low cost and ease of fabrication of relatively complex shapes offer extremely attractive alternative to presently used ceramic or carbides, the importance of the glass-ceramic compositions and advantages flowing therefrom represent a dramatic advance in the state of the art.

It should be noted herein that the complete fragmentation of the 0.30 caliber projectile in the tests noted herein, is very significant to potential ballistic protection. The fragmentation was so complete that the largest size fragment was so small as to be ineffective to cause likely or probable fatal or serious injury to persons who might be struck by the fragments. The remaining fragments which were smaller ranged in size comparable to very fine particles of dust. The larger particles appeared to be formed from the thin copper jacket surrounding the lead body of the bullet and therefore were relatively thin and of very light weight.

Considering the fact that the energy absorbed at impact was very substantial, the velocity of the fragments obviously was reduced very significantly. This fact combined with the small size further reduces their effectiveness to penetrate deeply and cause serious injury to personnel or damage equipment disposed behind an armour barrier made from a glass-ceramic according to the present invention.

Forming products from the base glass batch may be done in any well known conventional manner such as pressing, stretching or blowing. Plates, sheets or tubes can be produced. For relatively small plates, the most reasonable method appears to be pressing. The pressed plates can have anisotropic properties according to their thickness and can be produced in any geometrical form which has flat sides. Hexagon shapes would have better impact resistance properties.

Production of composite plates from more than one layer of the compositions of the present invention wherein certain properties of each layer is adjusted according to the need of the application could be accomplished as well as varying the thickness of each layer of the different compositions used. To produce a composite plate from two or more different compositions in mass production, it would be necessary to use two or more glass furnaces which have the appropriate feeders and pressing equipment. The timing of the feeders could be adjusted between the furnaces to pour the different compositions into the pressing equipment at appropriate intervals to form the desired layers.

With particular reference to processes in which the product forming step prior to crystallization is continuous as opposed to a batch type, one may choose to omit the cooling step described herein after the necessary annealing temperature has been reached and held. The second stage of thermal treatment for crystallization of the product could be initiated after the higher temperature ranges employed to achieve annealing have been reached and held. If this is deemed desired in a given process application, some adjustment of the ranges of temperature and time for the second thermal treatment to achieve crystallization would likely be required to obtain satisfactory results in accordance with the present invention.

What is claimed is:

1. A semicrystalline ballistic-resistant glass-ceramic body having a plurality of fine-grained, randomly oriented inorganic crystals substantially uniformly dispersed in a glassy phase said crystals being formed by crystallization in situ from a glass body made from a base glass forming batch having a composition consisting essentially of by weight on an oxide basis: 78.5%–84.5% $SiO_2$, 9.5%–15% $Li_2O$, 1%–6% $Al_2O_3$ and 1.5%–4% $K_2O$ in a combination totaling 100% of the base glass batch and further including, on a weight basis calculated as a percentage of the total weight of said base glass batch, a combination of the group consisting of $TiO_2$, $ZrO_2$ and $SnO_2$ wherein the total of said combination of said group is not more than 5% and the weight ratio between them is approximately 3:2:1 respectively; and including MgO between the range of 30% to approximately 50% of the amount of $Al_2O_3$ on a weight basis in the composition and wherein the body is characterized by having lithium disilicate, cristobalite and spinel as the primary crystalline phases, a coefficient of thermal expansion which ranges from about 100 to $125 \times 10^{-7}/°C.$ (up to 800° C.) and a density which ranges from about 2.45 to 2.50 gms/cc.

2. The semi-crystalline glass-ceramic body defined in claim 1 further including one or more oxides from the group consisting of 0–3.5% $Na_2O$; 0–1.2% $B_2O_3$; 0–1.5% $CeO_2$; 0–0.9% $Cr_2O_3$ and wherein the total of $Na_2O$ and $K_2O$ is less than about 5%.

3. The semi-crystalline glass-ceramic body defined in claim 1 wherein the base glass composition consists essentially of the following percentages of components by weight on an oxide basis: 81.0–83.0% $SiO_2$; 11.0–13.0% $Li_2O$; 1.5–4.0% $Al_2O_3$; 1.5–3.0% $K_2O$.

4. A method of making a semi-crystalline ballistic-resistant glass-ceramic body which comprises forming a molten body of glass consisting essentially of a base glass batch of the following components by weight percent, 78.5 to 84.5% $SiO_2$; 9.5 to 15% $Li_2O$; 1 to 6% $Al_2O_3$; 1.5 to 4% $K_2O$, the sum of which totaling at least approximately between 95 to 97.5% of the total composition which also includes the combination of the group consisting of $TiO_2$, $ZrO_2$ and $SnO_2$ wherein the total of said combination of said group is not more than 5% on a weight basis as a percentage of the total weight of said base glass batch and the weight ratio of said group members relative to each other is 3:2:1, respectively; and including MgO in the range between 30% to approximately 50% of the amount of $Al_2O_3$ on a weight basis in the composition; forming said molten body into a solid glass body; then heating said solid body up to a temperature between 480–530 degrees centigrade and holding said temperature for a time period between approximately one to twenty-four hours for annealing purposes before cooling said body to room temperature; then heating said annealed glass body up to approximately 480 to 530 degrees centigrade at a rate between approximately 1 to 5 degrees centigrade per minute, then continue heating said body at a rate between approximately 0.3 to 1.0 degrees centigrade to a temperature between 680 to 725 degrees centigrade and holding said temperature between said 680 to 725 degree centigrade range for a time period between approximately one-half to twenty-four hours; then continuing to heat said body at a rate of temperature increase of 0.5 to 6 degrees centigrade until the temperature of said body reaches approximately 830 to 870 degrees centigrade, then holding said body within the last mentioned temperature range for approximately 5 minutes to 5 hours; then cooling said body at a rate of approximately 0.5 degrees to 3 degrees centrigrade per minute to approximately 380–300 degrees centigrade; then cooling is continued at a cooling rate of approximately 2 to 12 degrees centigrade per minute to room temperature and wherein the body is characterized by having lithium disilicate, cristobalite and spinel as the primary crystalline phases, a coefficient of thermal expansion which ranges from about 100 to $125 \times 10^{-7}/°C.$ (up to 800° C.) and a density which ranges from about 2.45 to 2.50 gms/cc.

* * * * *